July 15, 1941.  E. E. LANDAHL  2,249,531
OVERHEAD CONVEYER
Filed Oct. 28, 1940  2 Sheets-Sheet 1
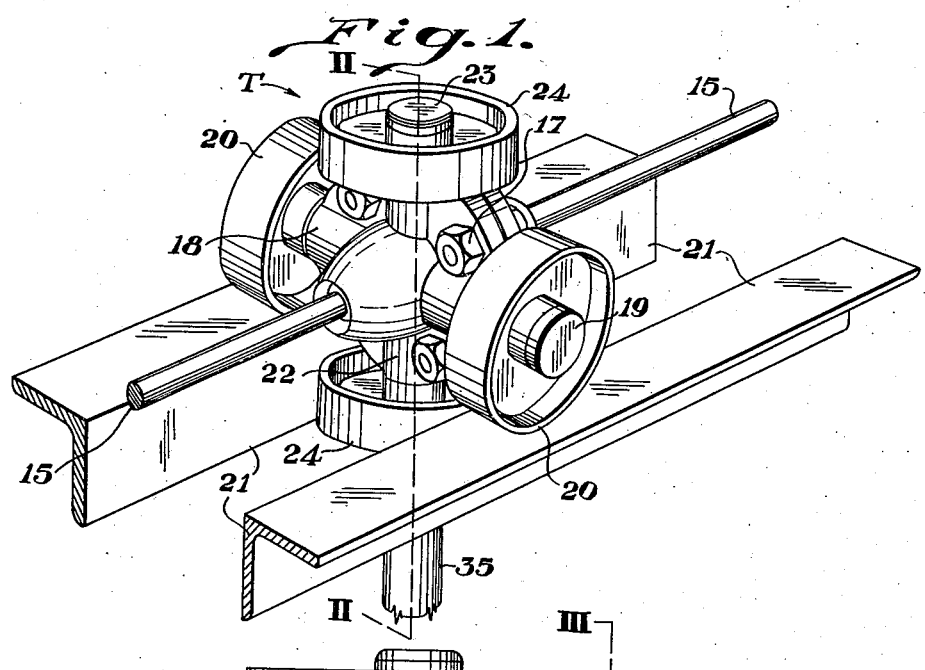
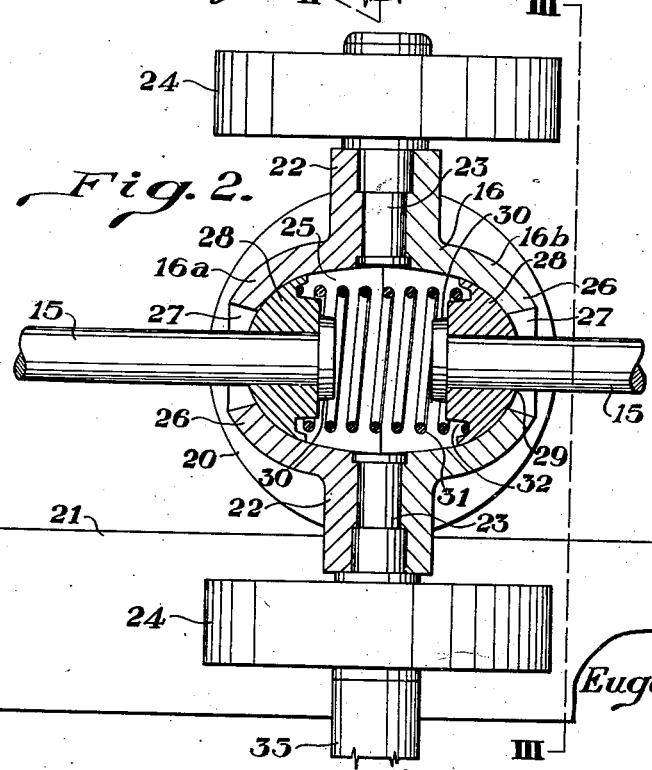
Inventor
Eugene E. Landahl
By
Attorney

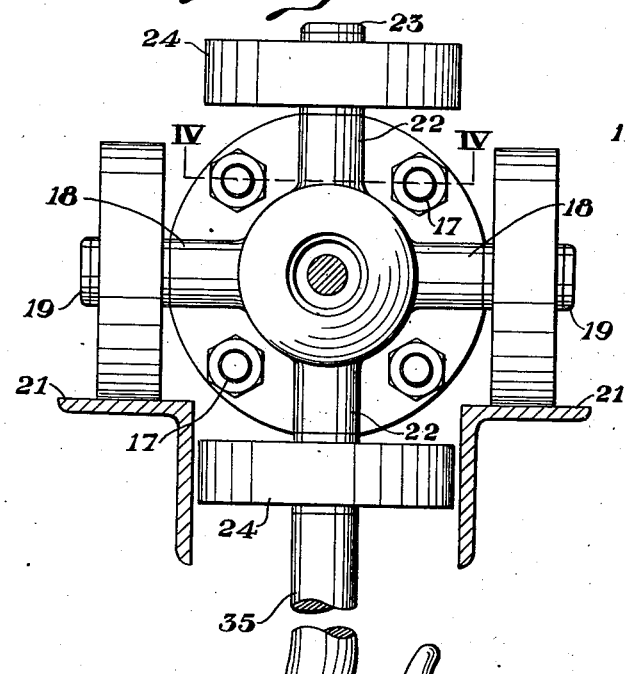
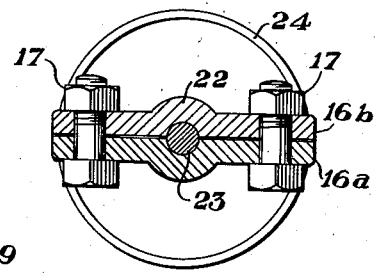
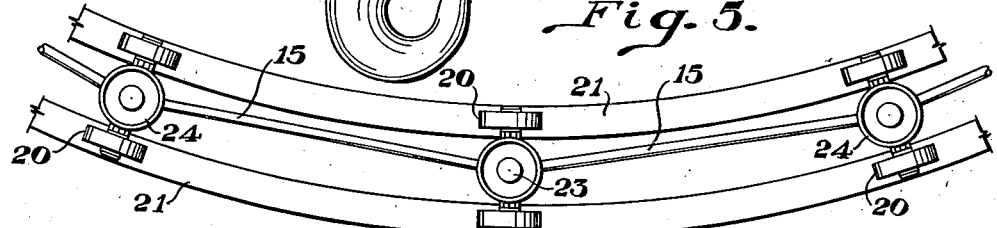
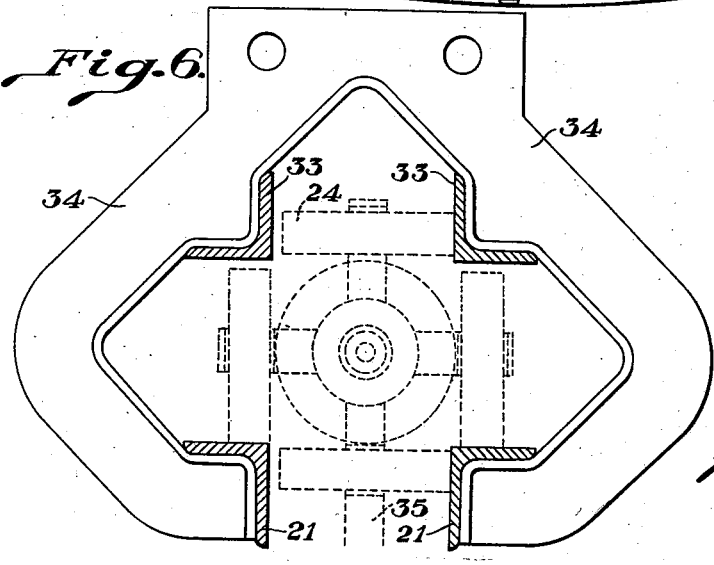

Patented July 15, 1941

2,249,531

UNITED STATES PATENT OFFICE 2,249,531

OVERHEAD CONVEYER

Eugene E. Landahl, Columbus, Ohio

Application October 28, 1940, Serial No. 363,133

7 Claims. (Cl. 105—155)

This invention relates to conveyers of the so-called overhead type. Such conveyers are widely used in manufacturing establishments in transporting goods from one department to another and are quite desirable in that they are usually suspended from a ceiling, or other equivalent overhead supports, so that they do not take up valuable floor space or interfere with floor activities.

The general object of the invention is to provide an improved conveyer of this type composed of a plurality of flexibly united trolley units, the latter being mounted for travel on an overhead trackway, each of the trolley units carrying two sets of track-engaging rollers, the rollers of each set being arranged at right angles to those of the other set, the said sets of rollers being flexibly linked together so that the trolley units may readily respond to curves, inclinations or dips in an associated trackway and will be positively guided, with a minimum of friction, while traveling along linear horizontal paths of movement, when rounding curves or when traveling in paths inclined with respect to the horizontal.

Another object resides in the provision of an overhead conveyor formed from simple and readily assembled parts, strong and substantial in design, and capable of being economically manufactured and installed.

With these and other objects in view, the invention consists in the novel features of construction, arrangements of parts and combinations of elements hereinafter more fully described and pointed out in the appended claims.

In the accompanying drawings:

Fig. 1 is a perspective view of one of the trolley units employed in the conveyer forming the present invention;

Fig. 2 is a vertical transverse sectional view taken through one of such trolley units on the plane generally indicated by the line II—II of Fig. 1;

Fig. 3 is a detail vertical sectional view on the line III—III of Fig. 2;

Fig. 4 is a horizontal sectional view on the line IV—IV of Fig. 3;

Fig. 5 is a diagrammatic plan view disclosing the relative positions of the several parts of my improved conveyer when operating on a curved trackway;

Fig. 6 is a transverse sectional view taken through one of the track supporting brackets when a curved trackway is employed.

The improved trolley conveyer, forming the present invention, is of the endless type, being composed of any suitable number of trolley units of the type indicated at T in Fig. 1, all of said units being flexibly joined to make a conveyer of any desired length. By reason of the peculiar construction of the trolley units, and the means employed for flexibly uniting the same, the conveyor is not limited to any particular plane of operation, but when installed in a building, the same can travel from floor to floor at relatively steep angles, may negotiate curves, or may travel horizontally or linearly for any necessary distance. Contiguous trolley units are united by metallic connecting rods of the type shown at 15. These rods provide a means for making the spacing or pitch of the trolley units flexible at any distance desired, the same being limited only by the space taken up by the trolley units per se.

Each trolley unit consists of a casing 16 formed from two duplicate sections 16a and 16b having flat vertically disposed meeting faces. These sections are secured together by means of bolts and nuts indicated at 17. Horizontally disposed hollow bosses 18 are formed with the sections 16a and 16b for the reception of horizontally disposed stub axles 19, and on the outer edge of these axles there are journaled vertically disposed rollers 20. These rollers engage with the horizontal flanges of a pair of trackway forming angle bars 21, which bars may be suspended from a ceiling or other type of overhead support. Also, the sections 16a and 16b are formed with vertically disposed hollow bosses 22, which receive vertically aligned stub axles 23, the latter projecting from the upper and lower portions of the casing 16. The outer ends of the axles 23 carry rollers 24, mounted to revolve in horizontal planes. The lower of the rollers 24 is normally positioned between the vertical flanges of the angle bars 21, and thereby guides the trolley unit for linear travel over the trackway formed by the angle bars. The upper of the rollers 24 is used primarily when the trolley unit is negotiating a curved trackway, as in Fig. 6.

The casing 16 has its two sections formed to provide an internal chamber 25, the latter having substantially spherical end portions 26, openings 27 being formed in said end portions for the reception of the connecting rods 15, said openings being of considerably greater diameter than the connecting rods to provide for relative movement between the casing 16 and the connecting rods associated therewith.

Within the chamber 25, there is provided a pair of spherical bearing heads 28, the spherical surfaces of which engage with the correspondingly formed end portions 26 of the chamber 25, as illustrated in Fig. 2.

Each of the heads 28 is formed with an axial opening 29 for the reception of the connecting rods 15, and the inner ends of said rods are enlarged as at 30 to join the same with the heads and prevent outward movement of the rods. A coil spring 31 of the expansion type has its opposite ends seated in grooves 32 provided in the inner surfaces of the heads 28, the said springs serving to positively maintain the heads 28 in contact with the surfaces 26. The enlarged ends 30 of the connecting rods are relatively spaced in order to admit of relative longitudinal movement between the adjoining ends of complemental connecting rods.

Two sets of rollers provided in each trolley unit, furnish means to enable the conveyer to readily negotiate curves, particularly curves of short radii. Also, the rollers guide the trolley unit on any type of trackway, whether straight, curved, horizontal or on an angle to the horizontal. This arrangement of the rollers provide a more adaptable construction, with less friction in operation than is obtained with the employment of conventional flanged rollers. Hanger brackets of any suitable type may be used for the support of the angle bars 21 constituting the trackway.

On a linear trackway, but two of these bars need be employed, as shown in Fig. 1. However, on curved trackways, I prefer to employ an upper set of bars as indicated at 33, which will be arranged on opposite sides of the upper of the rollers 24. When the upper set of bars is used, I employ hanger brackets 34 of the type depicted in Fig. 6. These brackets have widened sides which may be used to compensate for the projection of the connecting rods 15. The lower of the vertical axles 23 may be extended below the lower of the horizontal rollers 24 to form a shank 35, and this shank may constitute the upper portion of a hook or other depending carrier member, adapted for the removable reception of various products which the conveyer may be called on to support. The shape of this carrier member will of course vary with the nature, form or construction of the materials or products transported by the conveyer.

In this construction of my improved conveyer, it will be observed that there are no terminals, corner wheels, roller turns or standard take-up devices, as are so commonly found in previous types of overhead conveyers. Any suitable means may be employed for propelling the conveyer, such as a motor driven belt having spaced laterally extending brackets formed to register with the trolley units to impart advancing movement thereto. It will be noted that my improved conveyer is exceptionally compact, flexible and of high mechanical strength, requiring but small space to effect its installation. The conveyer is simple to lubricate and maintain in proper running order. Usually the chamber 25 is packed with a solid or other type of lubricant.

The spring 31, in addition to maintaining the heads 28 in contact with the inner surfaces of the casing sections, serves to hold the casing or trolley unit in such relation to the connecting rods that the angle developed between adjacent rods when the conveyer moves around a horizontal curve, as indicated in Fig. 5, will be bisected by the axis of rotation of the vertical rollers. This arrangement holds the axis of rotation on a line extending radially from the center of the curve regardless of the degree of curvature and the friction usually developed at such portions of the track will be eliminated.

Modifications of my improved conveyer may be made without departing from the spirit of the invention, and it is to be understood that the same is limited only by the scope of the appended claims.

What is claimed is:

1. A trolley unit for overhead conveyers comprising a casing, a set of rollers carried by said casing for rotation in substantially vertical planes, a second set of rollers carried by said casing for rotation in substantially horizontal planes, a chamber formed in said casing and having spherical apertured end walls, connecting rods extending through the apertures in said end walls and terminating within said chamber, heads carried by said rods, said heads having spherical surfaces for engagement with said end walls, whereby to permit of rocking movement of said connecting rods relative to said casing, and spring means engaging said heads to maintain the engagement thereof with said spherical surfaces.

2. A trolley unit for overhead conveyers comprising a casing, a set of rollers carried by said casing for rotation in substantially vertical planes, a second set of rollers carried by said casing for rotation in substantially horizontal planes, a chamber formed in said casing and having spherical apertured end walls, connecting rods extending through the apertures in said end walls and terminating within said chamber, heads carried by said rods formed with spherical surfaces for engagement with said end walls, whereby to permit of rocking movement of said connecting rods relative to said casing, and spring means engaging with said heads to positively maintain the same in contact with said end walls, said connecting rods having limited sliding movement relative to said heads.

3. An overhead conveyer comprising a trackway composed of horizontally spaced parallel angle bars, trolley units spaced longitudinally of said trackway for movement thereover, each of said trolley units including a set of rollers mounted for rotation about a horizontal axis and engaging the horizontal flanges of said bars, and a complemental set of rollers mounted for rotation about a vertical axis disposed in the same vertical plane as the axis of the first set of rollers, the rollers of said second set being disposed above and below the axis of rotation of the first set of rollers, the lower roller of said second set being arranged for engagement with the vertical flanges of said bars, and rod means flexibly connecting said trolley units, said rods and units combining to form an endless belt.

4. A trolley unit for overhead conveyers, comprising a body having opposed sections joined to form a unit, a hollow projection having a perforated end wall provided on each of said sections, said projections forming a chamber with spherical internal end surfaces when said sections are joined, stub shaft means radiating from said body, said shafts being in a single plane and each thereof being disposed at right angles relative to adjacent shafts, roller means journaled on each of said shafts, semispherical head members positioned in said chamber in engagement with the inner surfaces of said projections, and a rod extending from each of said head members through the perforations in said projections.

5. A trolley unit for suspended conveyers comprising a body having an internal chamber with spherical internal end surfaces, a double set of rollers carried by said body, said rollers being journaled for rotation about horizontal and vertical axes arranged in the same plane, the longitudinal axis of said internal chamber being in a plane disposed at right angles to that occupied by the axes of rotation of said rollers and passing through the point of intersection of said axes, and partially spherical head members disposed in said internal chamber for engagement with said spherical end surfaces.

6. A trolley unit for suspended conveyers comprising a body having an internal chamber with spherical internal end surfaces, a double set of rollers carried by said body, said rollers being journaled for rotation about horizontal and vertical axes arranged in the same plane, the longitudinal axis of said internal chamber being in a plane disposed at right angles to that occupied by the axes of rotation of said rollers and passing through the point of intersection of said axes, partially spherical head members disposed in said internal chamber for engagement with said spherical end surfaces, and means for yieldably maintaining said head members in such engagement.

7. An overhead conveyer comprising a plurality of horizontally spaced rails, a plurality of trolley units spaced longitudinally of said rails for movement thereon, each of said units having a body provided with an internal chamber with spherical internal end surfaces, a double set of rollers carried by said body, said rollers being journaled for rotation about horizontal and vertical axes arranged in the same plane, the longitudinal axis of said internal chamber being in a plane disposed at right angles to that occupied by the axes of rotation of said rollers and passing through the point of intersection of said axes, partially spherical head members disposed in said internal chamber in engagement with said spherical end surfaces, and rod means extending between the units, the ends of said rod means engaging said head members.

EUGENE E. LANDAHL.